G. SHARPS.
ROTARY TOOTH BRUSH.
APPLICATION FILED APR. 13, 1917.

1,265,536.  Patented May 7, 1918.

INVENTOR
Gabriel Sharps,

WITNESSES

BY
ATTORNEY

UNITED STATES PATENT OFFICE.

GABRIEL SHARPS, OF KARNAK, NORTH DAKOTA.

ROTARY TOOTH-BRUSH.

1,265,536.

Specification of Letters Patent.     Patented May 7, 1918.

Application filed April 13, 1917.   Serial No. 161,807.

*To all whom it may concern:*

Be it known that I, GABRIEL SHARPS, a citizen of the United States, residing at Karnak, in the county of Griggs and State of North Dakota, have invented new and useful Improvements in Rotary Tooth-Brushes, of which the following is a specification.

This invention relates to tooth brushes, and more especially to those which rotate; and the object of the same is to produce a serviceable and inexpensive tooth-brush whose head is rotated by a spring motor mounted in the handle of the brush and wound by hand, the action of the motor being controlled by a brake.

This and other objects are explained by the following specification, reference being had to the drawings wherein:—

Figure 1:
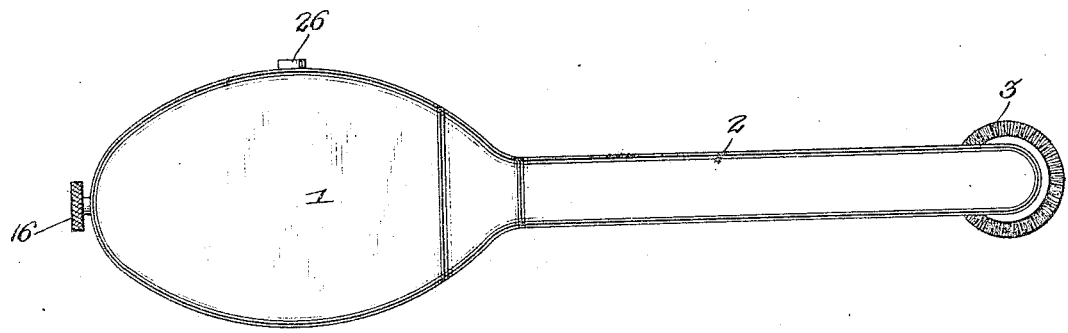
Figure 1 is a side elevation of this tooth brush ready for use.

The casing of this brush may have any suitable configuration, but as shown I form it with an enlarged hollow handle 1 and a long tubular stem 2 at the outer end of which latter is mounted the tooth brush head 3, the same being of that form which is adapted to rotary movement. A stem or shaft 4 projects from the head through the outer end of the long stem 2 and carries a pulley 5, and from this pulley an endless belt 6 (preferably of rubber) leads throughout the length of the stem 2 and around a driving pulley 7 mounted within the hollow handle 1. When this pulley is rotated, it will be obvious that rotary movement will be imparted to the brush, and the head of the latter is of such size and disposition that it may be inserted in the mouth and against the teeth, although it is quite possible that this brush could be used for other purposes than for cleaning teeth.

Figure 2:
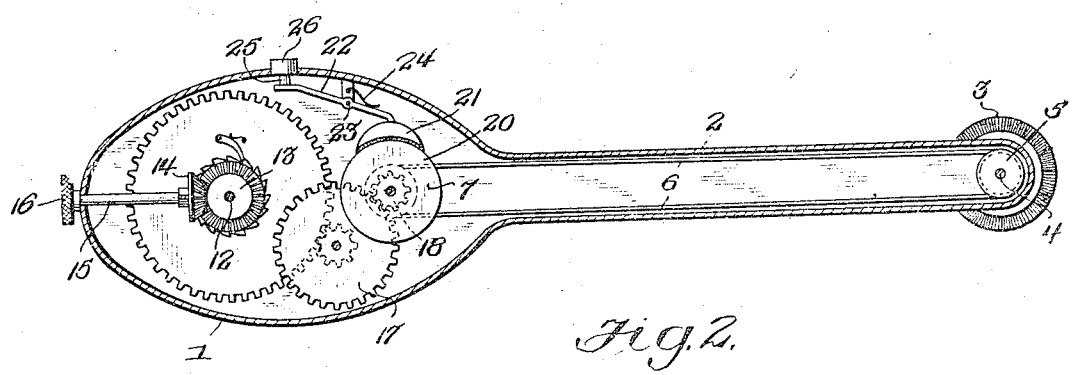
Fig. 2 is a vertical section thereof.
Figure 3:
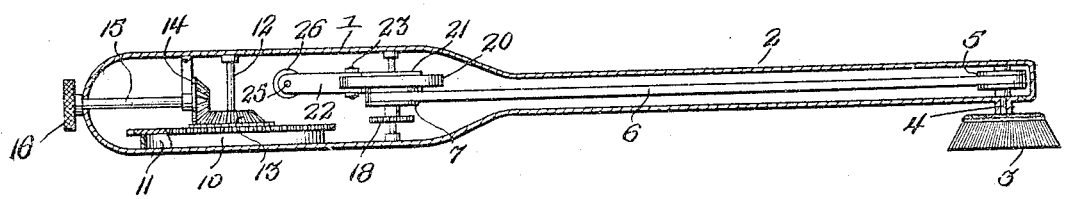
Fig. 3 is a horizontal section thereof.

The spring motor for imparting rotation to the driving pulley 7 is best seen in Figs. 2 and 3. While I do not wish to be limited to the details of construction of this motor, it embodies essentially a drum 10 within which is coiled a spring 11 connected at its inner end to the main arbor 12 and at its outer end to the drum as usual. Said arbor has on one extremity a beveled gear 13 meshing with another gear 14 on a shaft 15 which leads through the end of the handle to a knob or winding handle 16 by means of which the spring may be put under tension or the spring motor wound as clearly understood. Instead of the knob shown, a suitable key could be employed, but this detail need not be illustrated. The periphery of the drum is provided with teeth which are connected through a chain of gearing broadly indicated by 17, with a gear 18 on the shaft of the driving pulley 7, so that as the drum revolves the driving pulley is rotated at a high rate of speed in a manner not necessary to amplify further.

One of the gears of the train, and possibly the shaft of that gear which is connected with the driving pulley, carries a brake wheel 20, and against the periphery of this wheel is borne a brake shoe 21 mounted on one end of a lever 22 which is pivoted at 23 upon a bracket within the casing and moved into active position by a spring 24 secured upon the bracket. The other end of this lever carries a stem 25 which projects through the wall of the casing and is provided with a knob 26 as shown. When now this knob is pressed upon, the lever is turned on its fulcrum and the brake shoe is moved out of contact with the brake wheel 20; and thereafter the rotation of the spring drum, through the chain of gears, causes the rotation of the shaft which carries the driving pulley, and the latter through its belted connection with the driven pulley 5, causes the rotation of the brush head 3. It is quite obvious that in the normal position of holding the handle 1 within the hand, the ball of the hand may be caused to rest against the knob or button 26 so that constant pressure is exerted therein and the brake shoe is held off the brake wheel. Or, it might be possible to hold the handle between the ball of the hand and the tips of the fingers, and bear the tip of the thumb on the knob 26 when the brake is to be removed and the brush head is to rotate. From time to time the knob 16 is turned to rotate the shaft 15 and put tension on the main spring as will be clearly understood. However, I prefer that the train of gearing shall be such that one complete winding of the spring will store tension enough therein to drive the brush head 3 for a great many revolutions. It is possible that if the user should wind the spring up on Sundays, he could use the brush throughout the complete week. This, however, depends upon the number of gears in the train, the strength of the spring, and the size of parts. The latter are of the desired materials and construction, and further details than as herein given are unimportant.

What is claimed as new is:—

A rotary tooth brush comprising a casing formed to fit within the hand and terminating in a reduced extension, a transverse shaft journaled in the free end of said extension, and extending beyond one side thereof, a brush secured upon the projecting end of said shaft, a driven shaft journaled in said casing parallel with said first named shaft, an operative connection between said shafts, and means for controlling the speed of rotation of said brush comprising a drum secured upon said second named shaft, a bracket extending inwardly from the inner wall of said casing, a lever pivoted intermediate its ends upon said bracket, a brake shoe on one end of said lever having an arcuate face engaging the periphery of said drum, a spring secured to said bracket and engaging said lever for urging said shoe into contact with said drum, and a push button on the other end of said lever projecting outwardly through the side wall of said casing at its central portion.

In testimony whereof I affix my signature.

GABRIEL SHARPS.